United States Patent
Hum et al.

(10) Patent No.: US 7,080,209 B2
(45) Date of Patent: Jul. 18, 2006

(54) METHOD AND APPARATUS FOR PROCESSING A LOAD-LOCK INSTRUCTION USING A RELAXED LOCK PROTOCOL

(75) Inventors: Herbert H. Hum, Portland, OR (US); Doug Carmean, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 386 days.

(21) Appl. No.: 10/327,099

(22) Filed: Dec. 24, 2002

(65) Prior Publication Data

US 2004/0123058 A1   Jun. 24, 2004

(51) Int. Cl.
*G06F 12/00* (2006.01)
*G06F 12/14* (2006.01)
*G06F 12/16* (2006.01)
*G06F 13/00* (2006.01)
*G06F 13/28* (2006.01)

(52) U.S. Cl. .................. 711/137; 711/146; 712/207; 712/217; 712/237

(58) Field of Classification Search ............. 711/137, 711/146, 150, 152, 163; 712/207, 217, 237
See application file for complete search history.

(56) References Cited

U.S. PATENT DOCUMENTS

| | | | |
|---|---|---|---|
| 5,185,871 A | 2/1993 | Frey et al. ............... 712/205 |
| 5,197,132 A | 3/1993 | Steely, Jr. et al. .......... 712/217 |
| 5,341,482 A | 8/1994 | Cutler et al. ............... 712/244 |
| 5,519,841 A | 5/1996 | Sager et al. ............... 711/202 |
| 5,835,745 A | 11/1998 | Sager et al. ............... 712/215 |
| 6,076,153 A | 6/2000 | Grochowski et al. ......... 712/23 |
| 6,094,717 A | 7/2000 | Merchant et al. ............ 712/32 |
| 6,163,838 A | 12/2000 | Merchant et al. ........... 712/219 |
| 6,205,542 B1 | 3/2001 | Grochowski et al. ....... 712/219 |
| 6,370,625 B1* | 4/2002 | Carmean et al. ............ 711/152 |
| 6,463,511 B1* | 10/2002 | Boatright et al. ........... 711/145 |
| 6,651,151 B1* | 11/2003 | Palanca et al. ............. 711/163 |
| 2002/0087810 A1* | 7/2002 | Boatright et al. ........... 711/145 |
| 2002/0199067 A1* | 12/2002 | Patel et al. ................. 711/145 |
| 2004/0117573 A1* | 6/2004 | Sutanto et al. .............. 711/163 |

* cited by examiner

*Primary Examiner*—Christian P. Chace
(74) *Attorney, Agent, or Firm*—Kenyon & Kenyon LLP

(57) ABSTRACT

A processing core using a lock scoreboard mechanism is provided. The lock scoreboard is adapted to manage a load-lock instruction. The load-lock scoreboard includes a plurality of scoreboard entries representing different conditions that must be met before the load-lock instruction can be retired. During execution of the load-lock instruction retirement conditions are speculatively performed, and the scoreboard is updated and checked accordingly. If the scoreboard indicates that one or more retirement conditions are not met, the load-lock instruction is replayed. Otherwise, the load-lock instruction is permitted to retire. Scoreboard management functions routinely update scoreboard contents as retirement conditions are cleared. This enables rapid retirement of load-lock operations.

24 Claims, 8 Drawing Sheets

METHOD AND APPARATUS FOR PROCESSING A LOAD-LOCK INSTRUCTION USING A RELAXED LOCK PROTOCOL

BACKGROUND OF THE INVENTION

The present invention generally relates to a method and apparatus for processing a load-lock instruction within a computer processor. More particularly, the invention relates to a system and method for processing a load-lock instruction within an out-of-order computer processor using a scoreboard mechanism.

Many processors, such as the Pentium® processor commercially available from Intel Corp., are "out-of-order" processors. An out-of-order processor speculatively executes instructions in any order as the requisite data and execution units become available. Some instructions in a computer system are dependent on other instructions through machine registers. Out-of-order processors attempt to exploit parallelism by actively looking for instructions whose input sources are available for computation, and scheduling them for execution even if other instructions that occur earlier in program flow (program order) have not been executed. This creates an opportunity for more efficient usage of machine resources and faster overall execution.

Load-lock instructions are used in multi-tasking/multi-processing systems to operate on semaphores. Semaphores are flag variables used to guard resources or data from simultaneous access by more than one agents in a multiprocessor system because it can lead to indeterminate behavior of a program. To guarantee unique access to a semaphore, a load-lock instruction in conjunction with a store-unlock instruction must be executed in an atomic fashion. That is, once the load-lock instruction accesses the semaphore value, no other instruction can operate on the semaphore until the corresponding store-unlock instruction frees it. The load-lock/store-unlock instruction duo also introduces another requirement in x86 processors in that all load instructions and all store instructions before the load-lock/store-unlock instruction duo in program order must be performed before the atomic operation. Also all subsequent load instructions and store instructions following the load-lock/store-unlock instruction duo in program order must not be performed until after both the load-lock/store-unlock instructions are completely executed. This "fencing" semantic must not be violated in any x86 program execution.

Speculative execution means that instructions can be fetched and executed before resolving pertinent control dependencies. Executing a "load-lock" instruction in a speculative out-of-order manner implies that the fencing semantics of the load-lock/store-unlock instruction duo can be violated if not handled correctly. However, if the load-lock instruction can be executed speculatively, there can be substantial performance improvements because the execution can be done when resources can be available and not when all instructions before the load-lock instruction have been completed.

Conventional methods in handling load-lock instructions in an out-of-order machine guarantee the fencing semantics by executing the load-lock instruction only when the instruction has reached "at-retirement". The "at-retirement" (or "at-retire") condition is flagged when an instruction is the next to be retired in program order. That is, all prior instructions in program order have already been retired. Moreover, such conventional methods lump all lock instructions whether they are split or not split across two cache lines (i.e., "split" or "non-split" lock operations), and whether they are to writeback in a cacheable region or not. As a result, substantially extraneous time and resources are applied broadly to prepare for and to process any load-lock instruction. Such approaches create a large latency and tie up significant processing resources for a load-lock instruction to be executed when a load-lock instruction becomes eligible for retirement.

DETAILED DESCRIPTION

Some embodiments of the present invention provide, in a processing core, a scoreboard dedicated to management of a load-lock instruction. The load-lock scoreboard includes a plurality of scoreboard entries representing different conditions that must be satisfied before the load-lock instruction can be retired. During execution of the load-lock instruction, the scoreboard is checked. If the scoreboard indicates that one or more retirement conditions are not met, the load-lock instruction is replayed. Otherwise, the load-lock instruction is permitted to retire. Scoreboard management functions routinely update scoreboard contents as retirement conditions are cleared.

Figure 1:
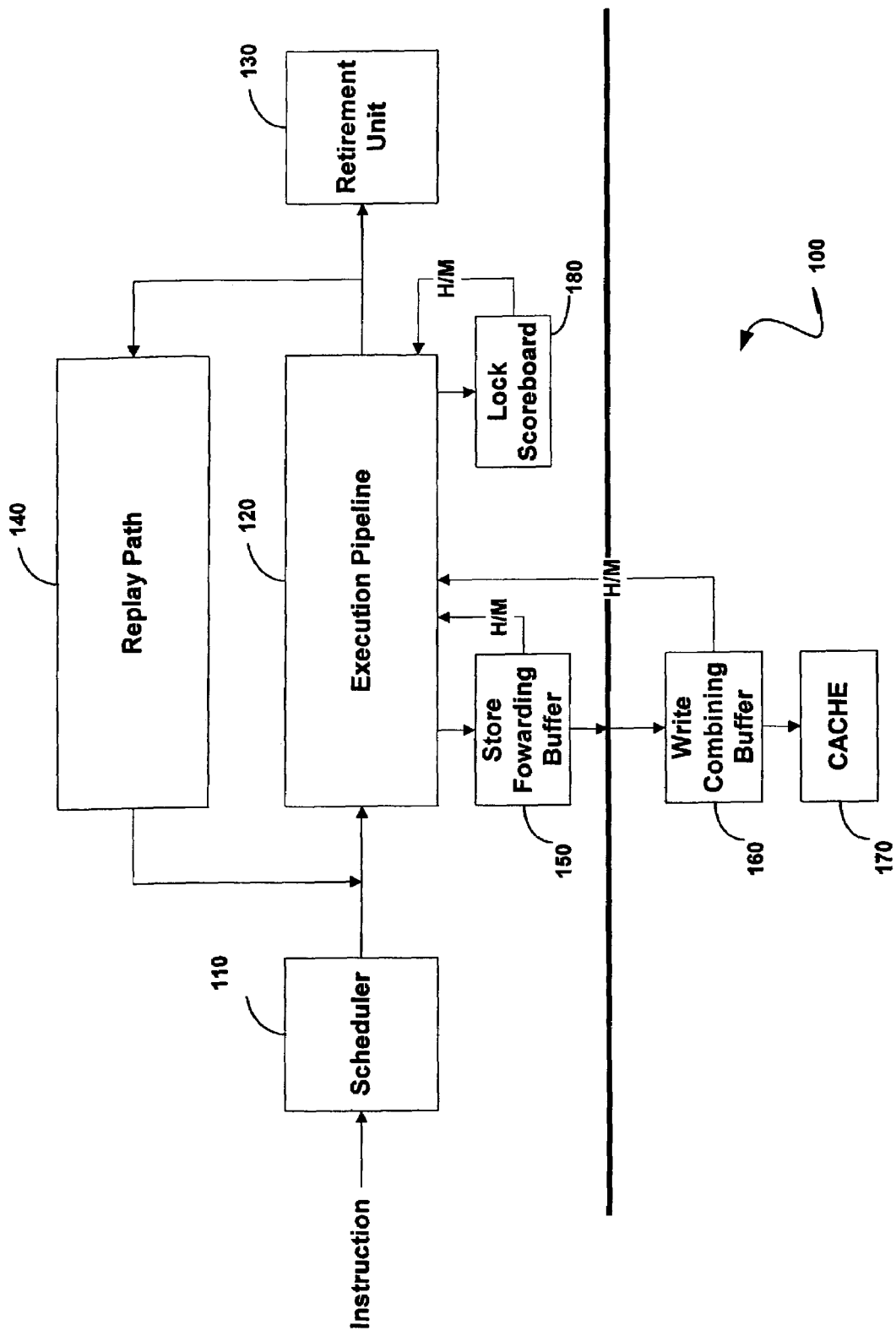
FIG. 1 is a block diagram illustrating a computer processor core with a replay system having a checker that includes a lock scoreboard mechanism, in accordance with a first embodiment of the present invention.

FIG. 1 is a block diagram of a processor core 100 within an exemplary processor, according to a first embodiment of the present invention. The processor core 100 may include a scheduler 110, an execution pipeline 120, a retirement unit 130, a replay path 140, and a store forwarding buffer 150. The processor core 100 may be connected to a write combining buffer 160 and a cache 170. The processor core 100 also may include conventional circuitry (FIG. 8) to connect the processor core 100 to a communication bus (FIG. 8) and permit it to communicate with other entities, or agents (FIG. 8), within a computer system.

The scheduler 110 may receive a stream of instructions from an instruction queue (not shown). As its name implies, the scheduler 110 may schedule each instruction for execution when associated input resources become readily available, regardless of program order. The execution pipeline 120, which may be connected to the scheduler 110, may include various execution units dedicated to instructions, such as various adders and arithmetic units, load units, store units and other circuit systems (not shown). Depending upon the instruction type, the scheduler may refer an instruction to an execution unit, which executes it. The execution pipeline 120 also may determine whether to retire or to replay the dispatched instruction.

The retirement unit 130, which may be connected to the execution pipeline 120, may retire instructions that are correctly and completely executed. The retirement unit 130 may retire instructions in program order. For example, a first instruction, Inst A, may occur before a second instruction, Inst B, in program order. Inst B cannot retire unless Inst A retires first even though Inst B was completely and correctly executed before Inst A was. The replay path 140 may be connected to the execution pipeline 120. The replay path 140 re-executes instructions that are incorrectly or incompletely executed. The store forwarding buffer 150 may also be connected to the execution pipeline 120. The store forwarding buffer 150 may temporarily store results from a plurality of executed store instructions when they become ready to retire.

Figure 8:
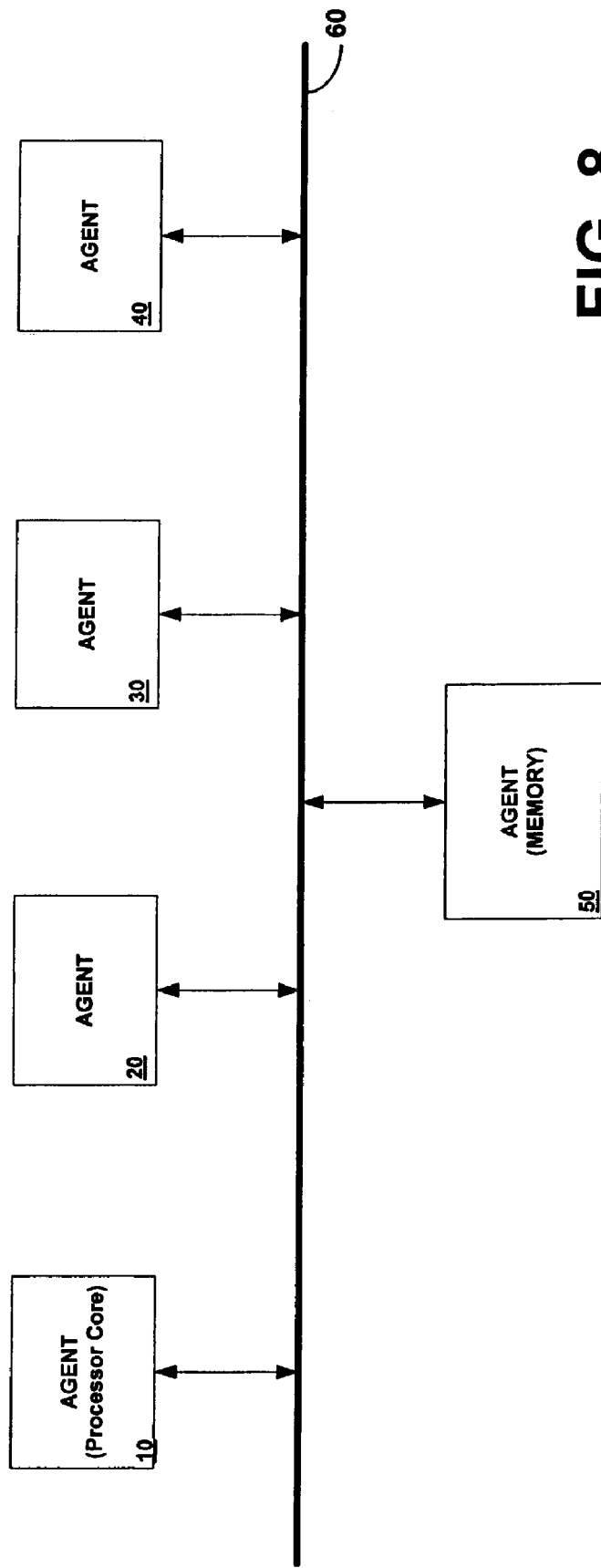
FIG. 8 is a block diagram of a known multi-agent system including the processor core for executing a load-lock instruction shown in FIGS. 1 and 5, in accordance with some embodiments of the present invention.

The processor core 100 may be connected to external units, including a write combining buffer (WCB) 160 and a cache 170. The WCB 160 may be connected to both the store forwarding buffer 150 and the execution pipeline 120. The WCB 160 temporarily stores data and addresses associated with store-unlock and load-lock instructions. The WCB 160 then waits for the best time to write temporarily stored data to the cache 170 using its associated address. Data is written to the cache 170 in units of a predetermined size, called a "cache line" herein. The cache 180 may be connected to the WCB 160 and to a system memory (FIG. 8). The cache 170 then waits for the best time to write such data to the system memory via an external bus. Both the store forwarding buffer 150 and the WCB 160 generate hit/miss signals to the execution pipeline 120. The hit/miss signal indicates whether or not a particular storage contains data and addresses to which a load-lock instruction is directed. In this regard, the operation and architecture of processors is well known.

Some embodiments of the present invention introduce a lock scoreboard 180 to which an execution unit 120 may refer when determining to retire or replay a load-lock instruction. The lock scoreboard 180 may maintain information regarding status of predetermined retirement conditions associated with all load-lock instructions. Essentially, it maintains a running tab of those retirement conditions that have been satisfied and those that have not. The status of the lock scoreboard 180 may be updated periodically, for example each time the load-lock instruction is executed, if any change is detected. The architecture of the lock scoreboard 180 can be quite simple; for example it may include a single field position to represent each of the retirement conditions.

Through use of the lock scoreboard 180, a retirement decision for a recently executed load-lock instruction becomes a very fast operation. An execution of a non-split writeback load-lock instruction needs only read from the lock scoreboard and, if any field indicates that a retirement condition has not been met, it replays the load-lock instruction. For example, in one embodiment, unfulfilled retirement conditions may be indicated with a binary flag set to a logical "1;" by logically ORing the contents of the various retirement flags, an execution unit 180 may determine whether to retire or replay a load-lock instruction in a single clock cycle. In other embodiments, unfulfilled retirement conditions may be indicated with a flag set to logical "0," in which case, the various retirement flags may be ANDed together. Thus, to determine whether to retire a load-lock instruction, the execution pipeline 120 may refer to the lock scoreboard 180.

Some embodiments of the present invention provide a scheme for speculatively processing a load-lock instruction in a multi-processor system using a scoreboard mechanism. Various embodiments of this scheme may be employed when new load-lock instructions are received and stored in the scheduler, when executing load-lock instructions, and when retiring load-lock instructions.

Figure 2:
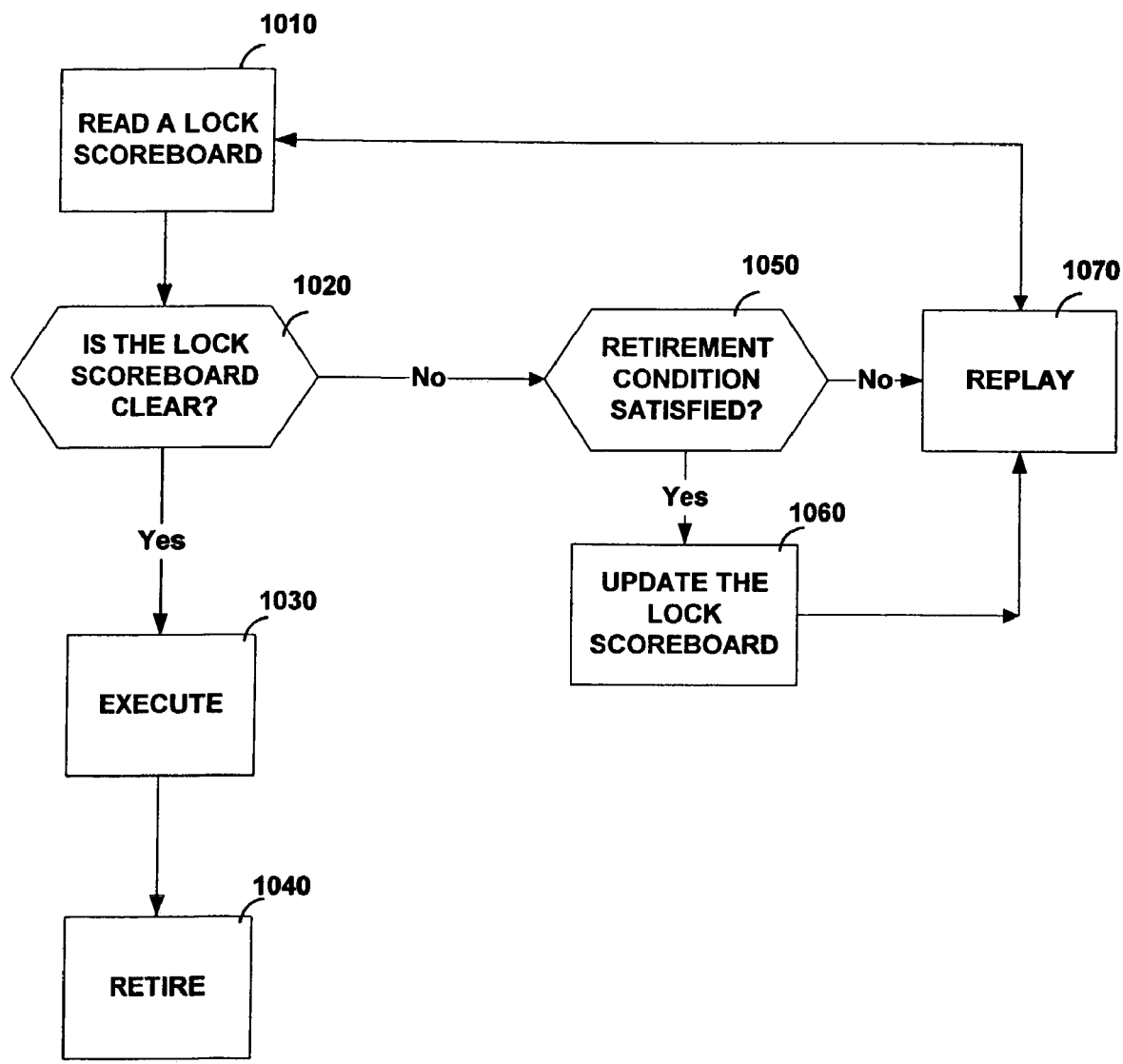
FIG. 2 is a flowchart depicting a method for speculatively processing a load-lock instruction within an out-of-order processor core using a lock scoreboard mechanism, in accordance with the first embodiment of the present invention.

FIG. 2 illustrates a method that may implement this scheme during the life of a load-lock instruction, according to the first embodiment of the present invention. More specifically, FIG. 2 provides a first method 1000 for speculatively processing a load-lock instruction within an out-of-order processor core using a scoreboard mechanism. The first method 1000 may become operable when the execution pipeline receives the load-lock instruction (block 1010). At that time, it may be determined whether the lock scoreboard is "clear," or completed (block 1020). "Clear," in this context, means that all retirement conditions for the load-lock instruction have been satisfied. More specifically, it may be determined whether each retirement condition monitored by the lock scoreboard has been satisfied. If so, the execution pipeline may execute the load-lock instruction (block 1030). After execution of the load-lock instruction, the processor core may send it to the retirement unit. The retirement unit may retire the load-lock instruction when it becomes ready (block 1040).

If the lock scoreboard is not clear, the processor core may update the lock scoreboard with the most recent information. More specifically, the processor core may determine whether at least one other field of the lock scoreboard can be cleared (block 1050). If so, the processor core may update the lock scoreboard by clearing the field (block 1060). The processor core may then replay the load-lock instruction by forwarding it to the replay path (block 1070). If no fields of the lock scoreboard can be cleared (block 1050), it may imply that there is no update to the lock scoreboard. Accordingly, the processor core may directly forward the load-lock instruction to the replay path, where the load-lock instruction is replayed (block 1070).

In accordance with one embodiment, a lock scoreboard entry may maintain retirement conditions information associated with one load-lock instruction (ie., whether or not the load-lock instruction is eligible for retirement). The lock scoreboard may be expanded to include multiple entries to permit the processor core to monitor more than one load-lock instructions simultaneously. For example, if the processor core supports multiple simultaneous threads, then an entry can be dedicated for each thread. Typically, the number of scoreboard entries will be determined during processor design based, at least in part, upon an expectation of the frequency with which load-lock instructions will be used in the processor.

Use of a scoreboard can be advantageous over prior techniques that performed iterative tests when the load-lock instruction reaches "at-retirement" to determine whether an executed instruction can be retired. That is, the processor core may run sequential tests to determine whether the requisite retirement conditions are satisfied before the load-lock instruction reaches "at-retirement."

One of the requisite retirement conditions may include the existence of a faulting condition or a bad address associated with the load-lock instruction. Thus, one field of the lock scoreboard may be set to represent a faulting condition or a bad address. As is known, a faulting condition and/or a bad address may include, but not limited to, incorrect forwarding of data, unknown data and/or addresses, memory ordering faults, self modifying code page faults and the like.

Another field of the lock scoreboard may represent whether there is a hit in the write combining buffer (WCB), which is associated with the load-lock instruction. There is a hit in the WCB when there exists a copy of the same cache line that was brought in by a previous store instruction. Such a WCB hit requires that that copy be evicted before the load-lock instruction can be executed. On a WCB hit, the lock scoreboard field designated for a WCB hit will remain uncleared and the processor core may replay the load-lock instruction.

Additionally, another field of the lock scoreboard may indicate whether the load-lock instruction is "at-retire". The at-retire condition of an instruction is generally indicated when an "at-retire" pointer points to the instruction. Accordingly, the instruction may not retire if it is not at "at-retire" or pointed by the at-retire pointer.

Another field of the lock scoreboard may indicate whether the load-lock instruction owns (or reserves) the lock scoreboard. For example, at any given point in program flow, the processor core may be executing one or more load-lock instructions. Whether or not the load-lock instruction owns the scoreboard depends on whether it is older than the load-lock instruction reserving the lock scoreboard. If the load-lock instruction currently being processed is "younger" in program flow than some other load-lock instructions, it may be replayed. Because the processor core retires instructions in program order, if there is some older load-lock instruction that has not yet retired, a younger load-lock instruction cannot own the lock scoreboard and should be replayed.

Yet another field of the lock scoreboard may represent whether there are older or senior store instructions to drain. An "older" store instruction refers to a store instruction that occurs before the load-lock instruction in program order and is still located in the execution pipeline. The senior store instruction refers to a store instruction that has been retired from the execution pipeline but has stored its data in the store forwarding buffer, and waiting to be written to the cache. The older and senior store instructions are typically drained before execution of the load-lock instruction to abide by the fencing semantics of a load-lock operation.

These tests each could take many clock cycles to complete and previously had been run once an executed load-lock instruction was considered for retirement, i.e., when the load-lock instruction is pointed to by the at-retire pointer. Furthermore, some of those tests may need to be done in sequence. According to an embodiment of the present invention, these same retirement conditions could be checked to determine whether to retire an executed load-lock instruction. However, if a test indicated that a particular retirement condition was met, the results of the test may be stored in the scoreboard for later use. Thus, on subsequent iterations, the test need not be run again. When a load-lock instruction finally is ready for retirement, the execution pipeline needs not consume several clock cycles on a series of tests. Instead, it can determine in a single cycle that the load-lock instruction is ready for retirement. In this way, the processor core may lock up the system memory once when everything (time and resources) is ready to execute the load-lock instruction.

One or more retirement conditions may be tested in a single event. It should be noted that each field may be determined independently of the other fields. It should also be understood that the above retirement conditions are purely exemplary in nature. Depending on the system architecture and implementation, the aforementioned retirement conditions may be altered, some may be omitted altogether.

Still referring to FIG. 2, the processor core may iterate the first method 1000 on the load-lock instruction until all of the requisite retirement conditions are met. In accordance with the first embodiment of the present invention, the processor core may perform the first method 1000 on a load-lock instruction several times before it can be retired. By performing the first method 1000, the processor core ensures that all requisite resources are available, and it is safe for the load-lock instruction to retire. Thus, when the load-lock instruction reaches "at-retirement", it can be executed without delay. This delay reduction allows the retirement unit to quickly move to subsequent instructions. Therefore, it also reduces the overall execution time of the program.

Figure 3:
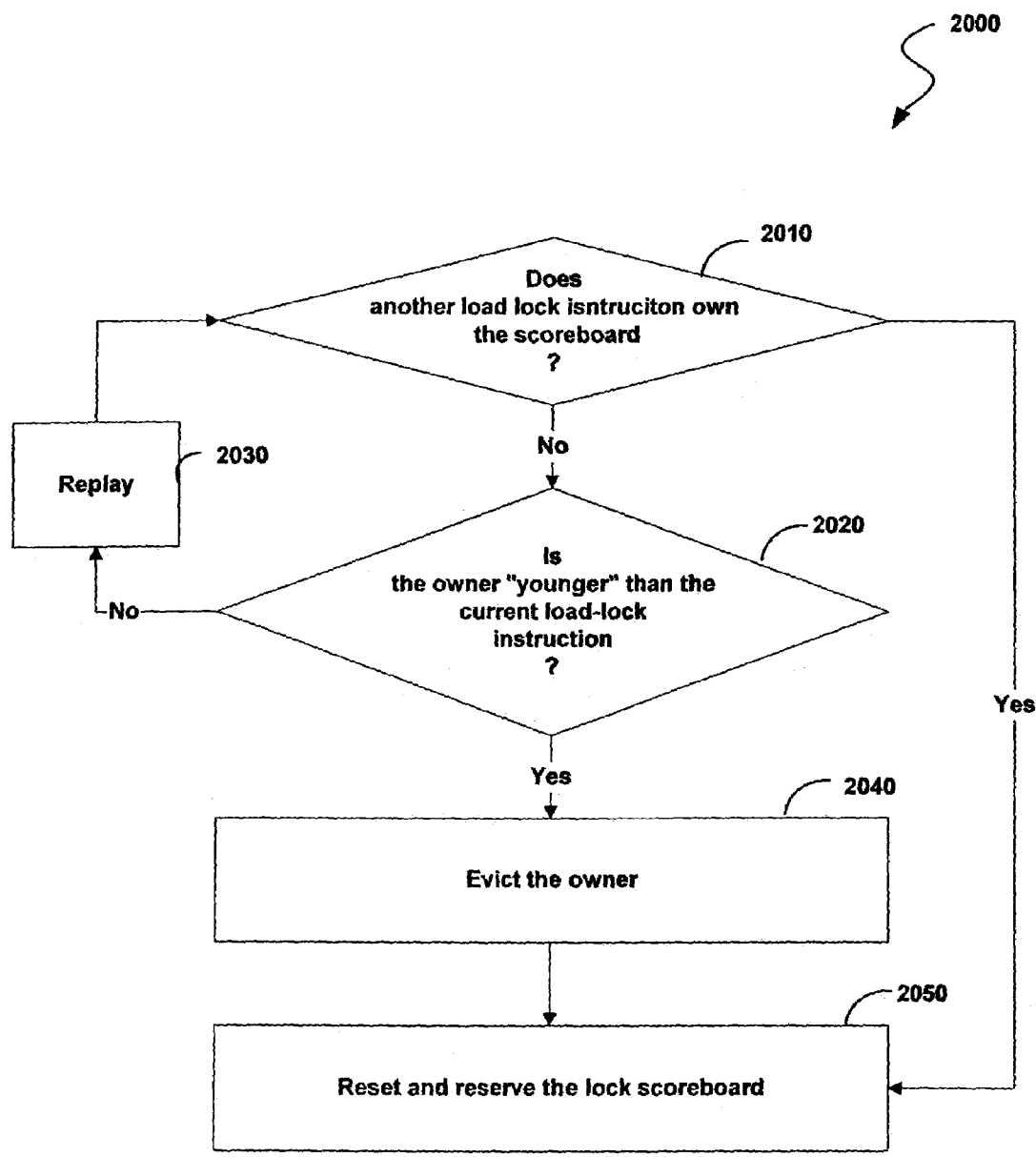
FIG. 3 is a flowchart depicting a method for reserving a lock scoreboard, in accordance with some embodiments of the present invention.

FIG. 3 illustrates a second method 2000 for the load-lock instruction to reserve a lock scoreboard, according to an embodiment of the present invention. The second method 2000 may become operable when the execution pipeline receives the load-lock instruction. When the execution pipeline receives the load-lock instruction, the processor core may determine whether the lock scoreboard is empty (block 2010). If the lock scoreboard is empty, the processor core resets and reserves the lock scoreboard (block 2050).

Alternatively, if the lock scoreboard is not empty or has an owner (block 2010), the processor core may determine whether the owner of the lock scoreboard is "younger" than the load-lock instruction (block 2020). A "younger" instruction refers to any subsequent instruction according to program order. If the owner of the lock scoreboard is younger, the execution pipeline may evict the owner (block 2040). Once the owner is evicted, the lock scoreboard may be reset, and the load-lock instruction being processed may reserve the scoreboard (block 2050).

On the other hand, if the lock scoreboard has an owner (block 2010) but the owner of the lock scoreboard is older than the load-lock instruction in process (block 2020), the processor core may replay the load-lock instruction in process by forwarding it to the replay path (block 2030). For example, there are three load-lock instructions, Inst A, Inst B and Inst C written consecutively in this order. In this case, Inst B and Inst C are younger than Inst A. Inst C is younger than Inst B and Inst A is older than Inst B. Assuming that the current instruction being processed is Inst B, if the lock scoreboard is currently occupied by Inst A, the processor core replays Inst B because the load-lock instruction occupying the lock scoreboard (Inst A) is older than the load-lock instruction being processed (Inst B). Alternatively, if the lock scoreboard is currently occupied by Inst C, the processor core evicts the Inst C from the lock scoreboard and reserves it for Inst B.

An older load-lock instruction has priority in retirement over a younger load-lock instruction because the processor core retires instructions according to program order. As mentioned, the lock scoreboard may be expanded to maintain information for more than one load-lock instructions. If so, because each lock scoreboard is for a load-lock instruction of one thread, program ordering of the load-lock instructions is maintained on a per thread basis.

Figure 4:
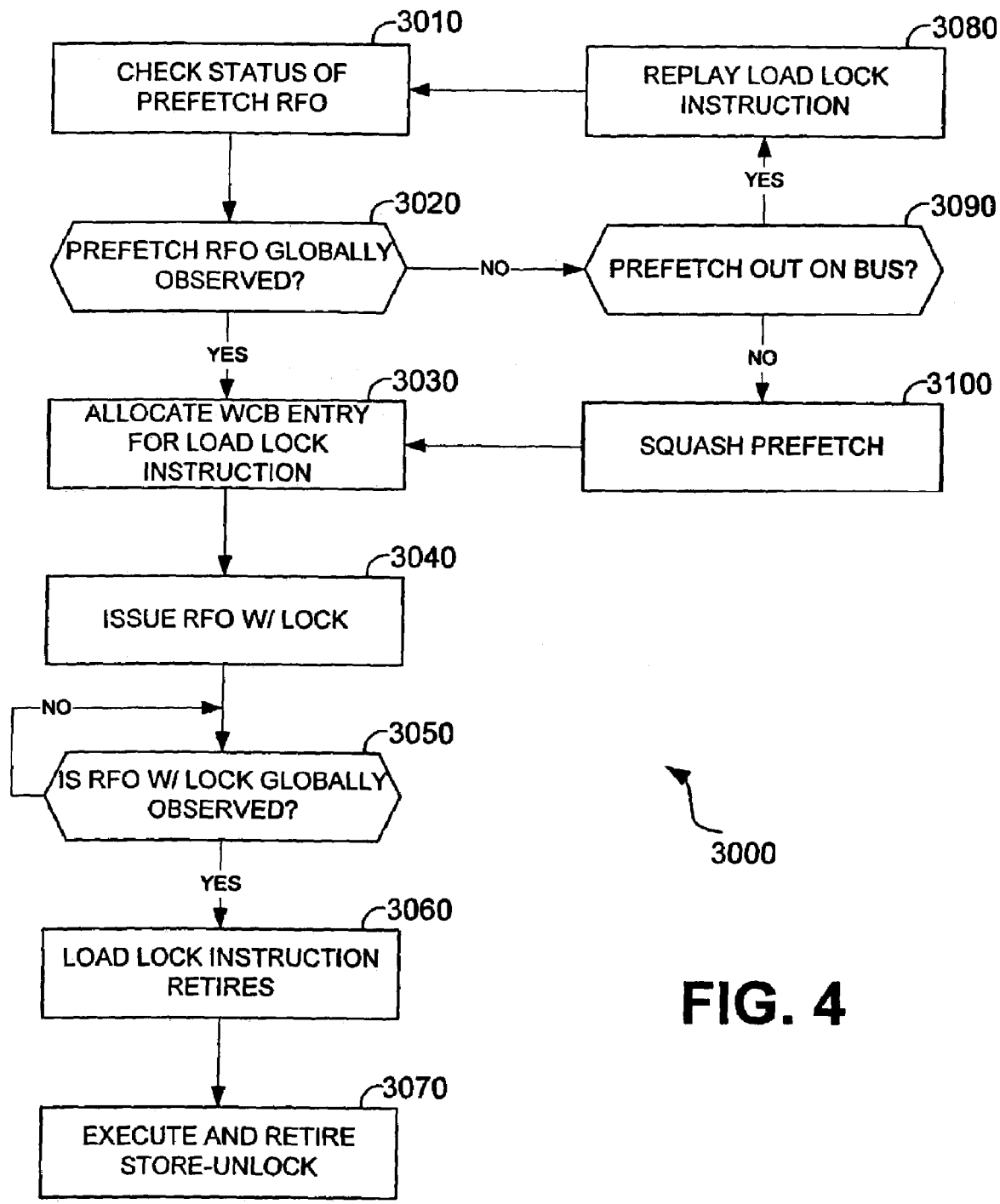
FIG. 4 is a flowchart depicting a method for speculatively performing checks when load-lock instructions reach a checker stage, in accordance with the first embodiment of the present invention.

FIG. 4 illustrates a method 3000 that may augment the scheme shown in FIG. 1 during the life of a load-lock instruction, according to the first embodiment of the present invention. The third method 3000 may become operable when the load-lock instruction is eligible for retirement or satisfies all of the requisite retirement conditions. At that time, the processor core checks status of a prefetch read for ownership request (prefetch-RFO) (block 3010). In conventional systems, when execution of a store instruction is attempted (such as a store-unlock instruction), it can cause a WCB to prefetch a cache line of data so that the data will be available when the store instruction retires. The prefetch-RFO is a transaction issued by a processor on a communication bus, through which the processor not only obtains a current copy of the cache line but it also obtains rights to modify data within the cache line according to a governing cache coherency protocol. At some point in the progression of the transaction, the transaction will be "globally observed." Global observation occurs when all other agents in the computer system—whether they be other processors, system memory or other integrated circuits—have observed the transaction and updated their own memories to reflect the processor's ownership of the requested cache line. For example, in the bus protocol of Intel's Pentium Pro® processor, global observation occurs when a transaction advances to a snoop stage; at this point, a processor receives "snoop" results in response to its request for the data.

If the prefetch-RFO has been globally observed (block 3020), the load-lock instruction may be allocated an entry in the WCB (block 3030). Subsequently, the WCB issues a read for ownership load-lock request (RFO load-lock request), if required (block 3040). Once an RFO load-lock request has been issued, the processor core waits until the RFO load-lock request is globally observed (block 3050). The processor core then may permit the load-lock instruction to retire (block 3060). Thereafter, the processor core may execute and retire the store-unlock instruction, which, in turn, unlocks the addressed memory location and stores data in the write combining buffer (block 3070). The WCB entry will only be released once the store-unlock instruction is retired. In the mean time, no other agents in the system can snoop that WCB entry out once it is locked. After the store-unlock instruction retires, the lock scoreboard is reset. The method 3000 may then conclude.

If, at block 3020, a prefetch RFO had not been globally observed, the processor core may determine whether the prefetch-RFO request is out on the communication bus (block 3090). Once the prefetch-RFO request is issued as a transaction on the bus, it will be permitted to progress to a natural conclusion. Therefore, the load lock instruction is replayed (block 3080) and the method 3000 returns to block 3010. However, if the prefetch RFO has not been issued on the bus, the method may terminate the request before it can be posted on the bus (block 3100). Instead, the method 3000 may advance to blocks 3030 and 3040, allocating a WCB for the load lock instruction and issuing an RFO with the lock enabled.

If systems that cause prefetch-RFO requests to be issued when a store instruction is executed, the prefetch-RFO causes an entry in the WCB to be allocated. Such implementations could cause a deadlock condition in the case of a load-lock/store-unlock pair. Because a load-lock ordinarily would not be permitted to retire until data for all store instructions are drained from the WCB, it would be possible for a WCB entry, which has been allocated for a younger store-unlock instruction to prevent the older load-lock instruction from retiring. The load-lock would be replayed until the WCB entry was drained. However, the WCB entry would never drain because it is associated with a store-unlock instruction that can retire only after the older load-lock instruction retires. To overcome this issue, a WCB entry may include a flag, possibly a one-bit flag, to indicate that the entry has been allocated for a store-unlock instruction. In this scheme, the flag can defeat a hit signal that otherwise would be generated by the WCB during a retirement test to determine, for example, if the load-lock instruction hits in the WCB. Every time the lock scoreboard is reset, the column of the WCB flags may be reset as well.

Figure 5:
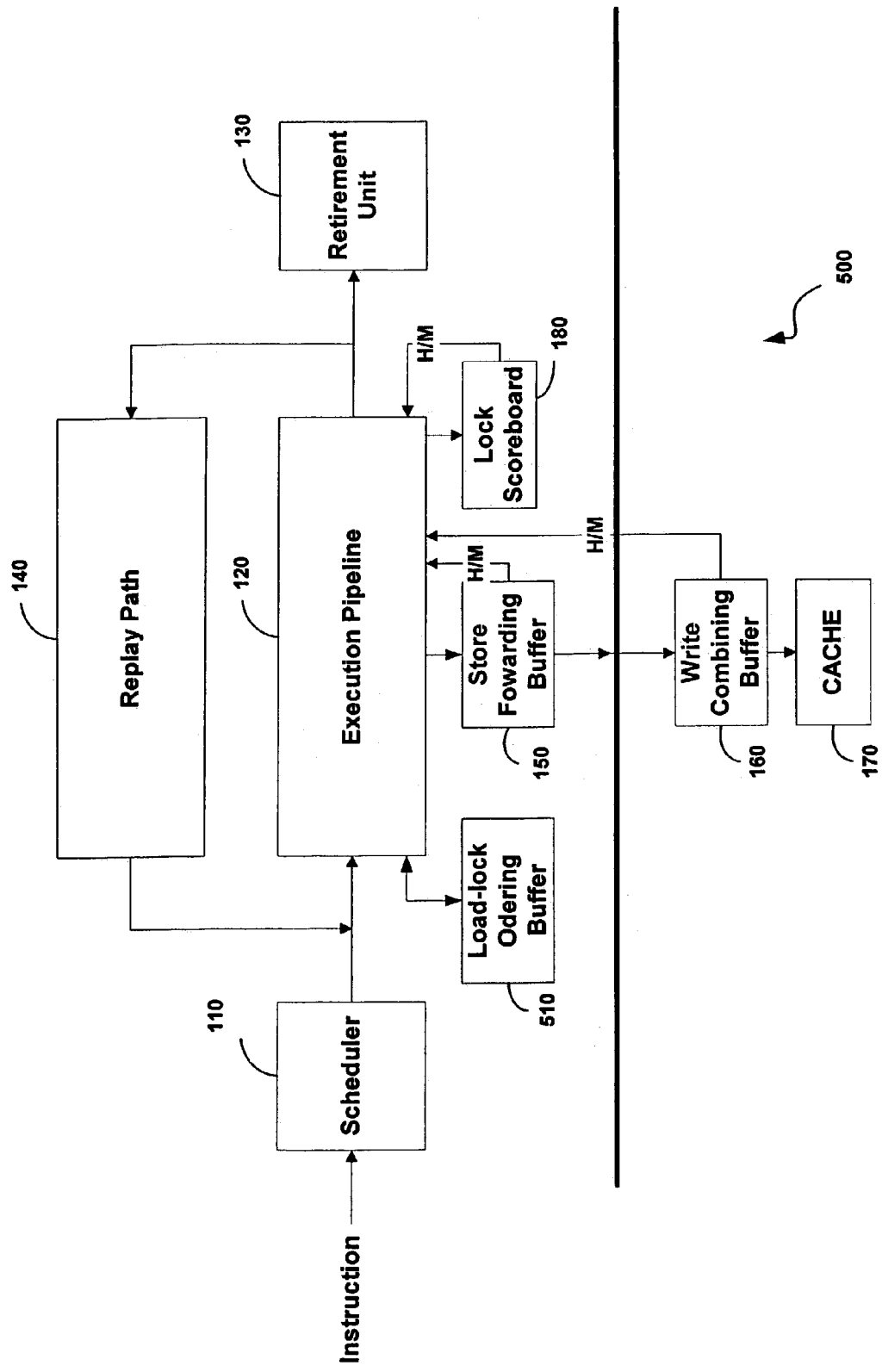
FIG. 5 is a block diagram illustrating a computer processor core with a replay system having a checker that includes a lock scoreboard mechanism, in accordance with a second embodiment of the present invention.

FIG. 5 is a block diagram of a processor core 500 according to a second embodiment of the present invention. The processor core 500 may include a scheduler 510, an execution pipeline 520, a retirement unit 530, a replay path 540, a store forwarding buffer 550, and a lock score board 580. The processor core 500 may be connected to a write combining buffer 560 and a cache 570. The processor core 500 also may include conventional circuitry (not shown) to connect the processor core to a communication bus and permit it to communicate with other entities, or agents, within a computer system.

The processor core 500 also may include a load-lock ordering buffer 590. The load-lock ordering buffer 590 is provided in communication with the execution pipeline. The load-lock ordering buffer 590 maintains an ordering (in program order) of all load-lock instructions that are currently being executed upon. The ordering of the load-lock instructions is tracked at allocation time, when the instruction is first received by the processor core 500. The load-lock ordering buffer 590 allows only the oldest load-lock instruction to reserve the lock scoreboard 580. In this way, the load-lock ordering buffer 590 prevents excessive "nuking," or an operation to clear contents in the execution pipeline. The "nuking" operation is described below in greater detail. Maintenance of the load-lock ordering buffer is known to ones skilled in the art.

The second embodiment accelerates execution of a load-lock instruction by dispatching it for execution before it has been confirmed that all older and senior store instructions have been drained from the WCB. In this embodiment, the "lifecycle" of a load-lock instruction may proceed through three stages. First, execution of the load-lock instruction may be stalled as the load-lock instruction awaits execution conditions to clear. Second, after the execution conditions clear, the load-lock instruction may execute and then sit in a "slow-safe" mode awaiting retirement. Finally, the load-lock instruction may retire and be removed from the processor core.

In the slow-safe mode, an instruction has been executed and awaits retirement. Slow-safe modes are known per se. When a load-lock instruction reaches a slow-safe state, the core has issued a request to other components within the processor; it is expected that those other components would have read a copy of the requested data to the core unless some other processor requests the data before the core's request can be completed.

Figure 6:
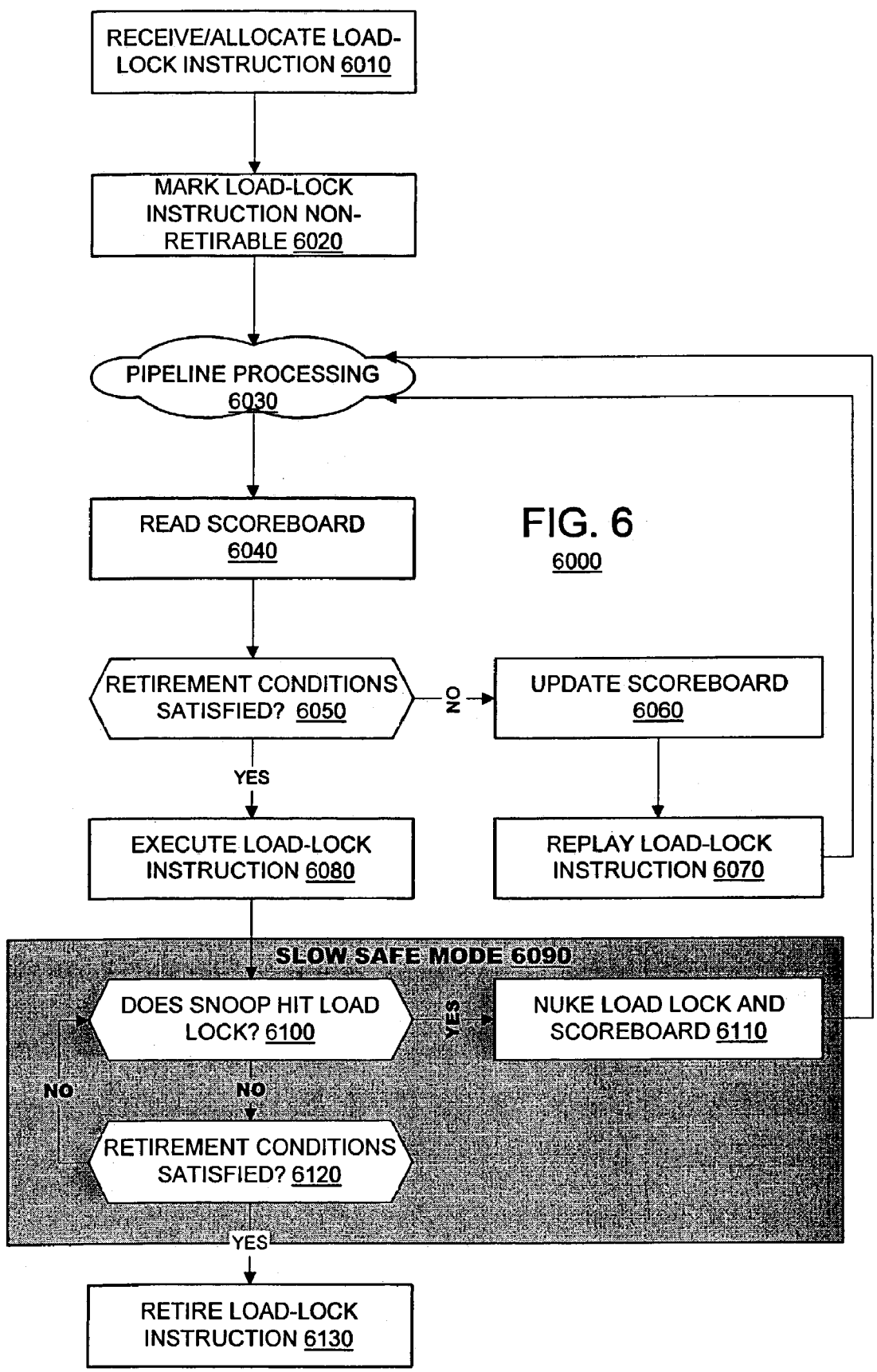
FIG. 6 is a flowchart depicting a method for speculatively processing a load-lock instruction within an out-of-order processor core using a lock scoreboard mechanism, in accordance with the second embodiment of the present invention.

FIG. 6 illustrates a scoreboard management method 6000 according to an embodiment of the present invention. The method 6000 may become operable when the execution pipeline receives the load-lock instruction and allocates core resources for it (block 6010). The load-lock instruction is marked as non-retireable and entered into the execution pipeline (blocks 6020, 6030). At some point in the pipeline, it may be determined whether to execute or replay the load-lock instruction. The lock scoreboard is read (block 6040) and, from the scoreboard, it is determined whether all execution conditions have been satisfied (block 6050). If not, the scoreboard may be updated (block 6060) and the load-lock instruction may be replayed (block 6070).

If the execution conditions have been satisfied, the load-lock instruction is executed (block 6080). After execution of the load-lock instruction, the processor core may advance to slow safe mode (block 6090).

As noted, a load-lock instruction may sit in slow-safe mode until the retirement unit is ready to retire it. While in slow-safe mode, if a snoop probe occurs that "hits" (is directed to the same memory as) the load-lock instruction, the load-lock instruction and the scoreboard are nuked (blocks 6100, 6110). The nuking operation involves clearing all outstanding instructions following (program-order) the load-lock instruction. The load-lock instruction is then returned to the execution pipeline and the scoreboard is cleared. Otherwise, however, the load-lock instruction is permitted to retire when the retirement conditions remain satisfied (blocks 6120, 6130)

In this second embodiment, the lock scoreboard may maintain fewer execution conditions than that according to the first embodiment. This scheme permits the load-lock instruction to execute (do work) earlier than it would in the first embodiment. For example, as compared to the first embodiment, the lock scoreboard in this second embodiment need not maintain information regarding whether there is any senior or older store instruction in the pipeline and/or the WCB to be drained. This condition may be eliminated based on an assumption that load-lock instructions are unlikely to conflict with such drains. Thus, the processor core may execute all the requisite operations of the load-lock instruction without ensuring that all the preceding store instructions are drained.

According to the second embodiment, the load-lock instruction reserves the lock scoreboard in the same manner as shown in FIG. 3. Particularly, the load-lock instruction may reset and reserve the lock scoreboard if it is empty. Alternatively, if the lock scoreboard is reserved by a "younger" instruction, the load-lock instruction may evict the younger load-lock instruction and reserve the lock scoreboard. Otherwise, the load-lock instruction may be replayed.

Figure 7:
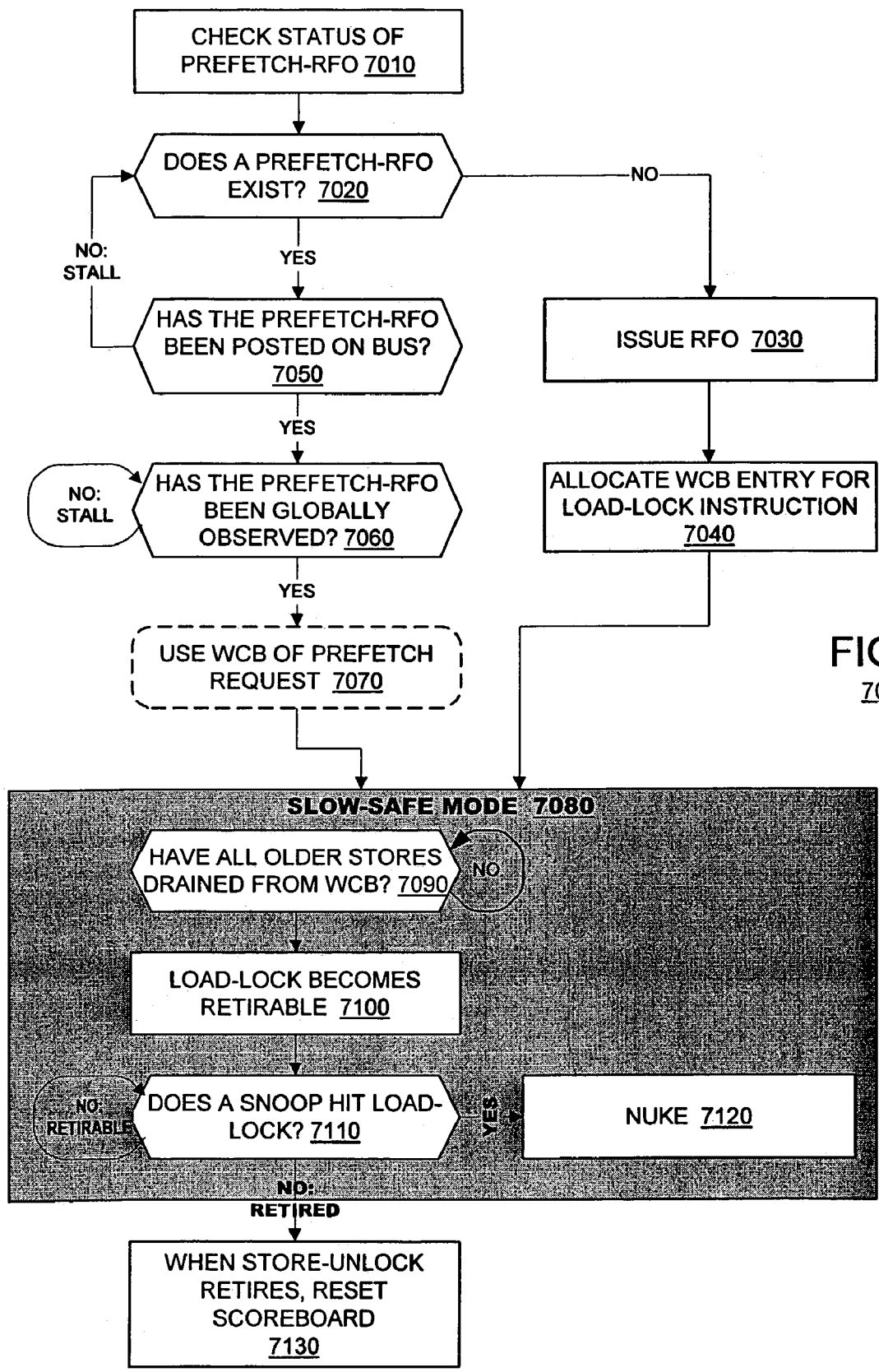
FIG. 7 is a flowchart depicting a method for speculatively performing checks when load-lock instructions reach a checker stage, in accordance with the second embodiment of the present invention.

FIG. 7 illustrates a method 7000 operable at the WCB according to an embodiment of the present invention. The method 7000 may become operable when the load-lock instruction is executed. At that time, the WCB checks the status of a prefetch read for ownership request (prefetch-RFO) that may have been generated by a store-unlock instruction that accompanies the load-lock instruction (block 7010). As mentioned previously, the prefetch-RFO is a transaction issued by a processor core on a communication bus, through which the process obtains a current copy of the cache line and the rights to modify data within the cache line. At some point during the progression, the transaction is globally observed by other agents in the system. When globally observed, other agents in the system update their own system memories to reflect the processor core's ownership of the requested cache line. When the load-lock instruction is executed, it cannot be known whether a prior prefetch-RFO has been completed on the bus, is in progress on the bus currently or was killed before it could be posted on the bus.

The method 7000 may determine whether any prefetch-RFO from execution of an associated store-unlock instruction exists (block 7020). If not, then a read for ownership (RFO) may be issued pursuant to the load-lock instruction (block 7030) and an entry in the WCB may be allocated for RFO data (block 7040). The load-lock instruction may progress to slow-safe mode.

If a prefetch-RFO does exist, then the method may determine what progress has been made with respect to the prefetch-RFO. The method may determine, for example, whether the prefetch-RFO has been issued on the bus (block 7050) or, if it has been issued, whether the prefetch-RFO has been globally observed (block 7060). If the prefetch-RFO exists but has not yet been issued on the bus, the method may wait until the prefetch-RFO is issued. In this case, it remains possible that the prefetch-RFO may be discarded due to some external event, such as low resource availability in transaction queue, in which case the method also should check to ensure that the prefetch-RFO remains in existence. If the prefetch-RFO has been issued but not yet globally observed, the method also may stall. At some point, the prefetch-RFO will be globally observed and the load-lock instruction may advance to slow-safe mode. In doing so, the load-lock instruction may be allocated the WCB entry that previously had been allocated to the prefetch-RFO request (block 7070).

As noted, in slow-safe mode (block 7080), the load-lock instruction can be expected to advance to retirement unless an exceptional event occurs, such as receipt of a snoop probe directed to the same address as the load-lock instruction. In slow-safe mode, the method waits until all older stores have drained from the WCB (block 7090) and thereafter marks the load-lock instruction as retireable (block 7100). Once the load-lock instruction becomes retireable, it waits until the instruction is retired. The method continually determines whether a snoop probe is received that is directed to the same address as the load-lock instruction (block 7110). If so, the WCB entry is nuked (block 7120) and the method terminates. If no snoop probe is received by the time the load-lock instruction is terminated, the slow-safe mode terminates. The method resets the scoreboard when the store-unlock instruction that follows the load-lock instruction retires (block 7130).

FIG. 8 illustrates a typical multi-processor core system having a plurality of agents 50-50, in which one of them (e.g., agent 50) is the processor core shown in FIG. 5 and/or FIG. 5. The plurality of agents 50-50 are in communication with each other over a common external bus 60. An "agent" may be an integrated circuit that communicates over the external bus, including microprocessors, input/output devices, memory systems and special purpose chipsets or digital signal processors. Typically, one of the agents, such as 50, is a system memory, which stores data. The agents 50-50 communicate over the external bus 60 using a predefined protocol. Data transfer operations, such as read and write operations, may occur in bus transactions that are posted on the bus by an agent and which are observed by other agents. A variety of bus protocols have been developed for computer systems, including pipelined bus protocols that permit several transactions to be pending on the bus simultaneously and serial bus protocols that resemble point-to-point communication between a pair of agents. During operation, other agents 50-40 may share the same data. A cache coherency protocol typically is defined for the system to ensure that, when an agent operates on data, it uses the most current copy of data available in the system. In this regard, the operation of computer systems is well known.

To execute a load-lock instruction, an agent 50 typically issues a transaction on the bus 60, indicating a read operation of an addressed cache line. Usually, a flag is provided in the transaction request data to identify that the read operation should lock the addressed cache line in system memory; the lock when enabled will prevent other agents from being able to access the cache line. The transaction may progress on the bus 60 according to conventional techniques. At some point, the transaction will reach global observation. At this point, circuitry within the system memory marks the addressed line as locked and all other agents invalidate any copies of the data that they might have stored. During progress of the transaction, a copy of the addressed cache line may be transferred to the requesting agent 50 from system memory 50 or from another agent (e.g., agent 20), if that agent stored a dirty copy of the data. In some cases, where the requesting agent 50 already stored a current copy of the data, the agent 50 may so indicate in the transaction data; data need not be transferred to the requesting agent 50 as part of the transaction.

Execution of a store-unlock instruction may cause another transaction to be posted on the communication bus 60. Again, the requesting agent 50 may issue transaction data on the bus 60, indicating a write operation to the addressed cache line. A flag may be provided in the transaction data to indicate that the addressed cache line is to be unlocked in system memory. When the transaction reaches global observation, the circuitry within system memory will clear the mark previously applied to the addressed cache line. The requesting agent 50 also posts a copy of the cache line contents which is stored in system memory.

Some embodiments of the present invention find application for load-lock instructions are confined to a single cache line in system memory. This is the most common type of load-lock instructions used by computer systems. Processing of other types of lock instructions, those that span multiple cache lines, may default to the conventional lock protocol readily known.

Additionally, several embodiments of the present invention are specifically illustrated and described herein. It will be appreciated, however, that modifications and variations of the present invention are covered by the above teachings and within the purview of the appended claims without departing from the spirit and intended scope of the invention.

What is claimed is:

1. A method comprising:
executing a load-lock instruction if predetermined execution conditions have been met but before data of older store instructions have been drained from a write combining buffer,
following the executing, marking the load-lock instruction as retireable,
if, before a predetermined retirement condition has been met, a snoop occurs that hits the load-lock instruction, then discarding all data of the load-lock instruction and scheduling the load-lock instruction for re-execution.

2. The method of claim 1, further comprising, retiring the load-lock instruction if the predetermined retirement condition is met.

3. The method of claim 1, wherein the execution comprises:
determining whether a prefetch request for ownership has been issued to an address of the load-lock instruction pursuant to a store unlock instruction that is associated with the load-lock instruction,
if not, issuing a request for ownership request directed to the address.

4. The method of claim 3, further comprising, if a prefetch request for ownership exists, waiting for the prefetch request for ownership request to be globally observed and, thereafter, advancing the load-lock instruction to a slow-safe mode.

5. The method of claim 4, further comprising,
determining whether all older store instructions have drained if the load-lock instruction is in the slow-safe mode;
if so, marking the load-lock instruction retireable.

6. The method of claim 1, further comprising storing status indicators of each execution condition in a lock scoreboard.

7. A processor, comprising:
a write combining buffer;
a processor core comprising an execution pipeline, the core
to allocate an entry in the write combining buffer for a load-lock instruction during execution thereof,
to execute the load-lock instruction if predetermined execution conditions have been met without determining if older store instructions have been drained from the write combining buffer, and
to flush the execution pipeline and all data of the load-lock instruction and to re-execute the load-lock instruction in response to a snoop of the load-lock instruction that occurs before a predetermined retirement condition has been met.

8. The processor of claim 7, wherein the processor core further comprises:
a scheduler to schedule execution of the load-lock instruction among a plurality of instructions,
a replay unit to cause executed instructions from the pipeline to be re-executed,
a retirement unit to retire the executed instructions, and
a scoreboard having a plurality of fields for storage of retirement condition flags associated with a load-lock instruction, the scoreboard provided in communication with the execution pipeline.

9. The processor of claim 8, wherein the processor core further comprises a load-lock ordering buffer in communication with the execution pipeline to store load-lock instructions in accordance with program order.

10. The method of claim 9, wherein the processor core permits only an oldest load-lock instruction in the load-lock ordering buffer to reserve the scoreboard.

11. The processor of claim 7, wherein the processor core determines whether a prefetch request for ownership has been issued to the write combining buffer allocated to the load-lock instruction pursuant to a store unlock instruction that is associated with the load-lock instruction,
if not, issuing a request for ownership request directed to the address.

12. The processor of claim 11, wherein the processor core waits for the prefetch request for ownership request to be globally observed and, thereafter, advances the load-lock instruction to a slow-safe mode if a prefetch request for ownership exists.

13. The processor of claim 8, wherein the load-lock instruction is marked retireable if older store instructions have been drained from the write combining buffer.

14. A method, comprising:
allocating an entry in a write combining buffer for a load-lock instruction if the load-lock instruction is received by the processor core,
determining whether predetermined execution conditions are satisfied using a scoreboard, the scoreboard maintaining information for each of the predetermined execution conditions associated with the load-lock instruction, if all of the predetermined execution conditions are satisfied, executing the load-lock instruction and advancing the load-lock instruction to a slow-safe mode, and if a snoop probe hits the allocated entry before predetermined retirement conditions are satisfied then nuking a corresponding entry in the scoreboard, otherwise, retiring the load-lock instruction.

15. The method of claim 14, further comprising:

once the load-lock instruction advances to the slow-safe mode, awaiting until older store instructions are drained before retiring the load-lock instruction.

16. A processor, comprising:

a write combining buffer to temporarily store data associated with a plurality of instructions, including a load-lock instruction, a processor core to allocate to the load-lock instruction an entry in the write combining buffer if received, the processor core executing the load-lock instruction and advancing the load-lock instruction to a slow-safe mode if predetermined execution conditions are satisfied, a lock scoreboard to maintain information for the predetermined execution conditions associated with the load-lock instruction, and a replay path to re-execute the load-lock instruction until a predetermined retirement condition is satisfied.

17. The processor of claim 16, wherein the processor core discards all data of the load-lock instruction and schedules the load-lock instruction for re-execution if a snoop hits the write combining buffer entry allocated to the load-lock instruction before a predetermined retirement condition has been met.

18. A method, comprising:

if predetermined execution conditions are satisfied, determining whether a prefetch request for ownership has been issued to an address of a load-lock instruction pursuant to a store unlock instruction that is associated with the load-lock instruction, if so, determining whether the prefetch request for ownership has been globally observed and advancing the load-lock instruction to a slow-safe mode, retiring the store-unlock instruction if a predetermined retirement condition is satisfied unless a snoop occurs that hits the load-lock instruction before a predetermined retirement condition has been met.

19. The method of claim 18, further comprising issuing a request for ownership directed to the address of the load-lock instruction if the prefetch request for ownership has not been issued and advancing the load-lock instruction to the slow-safe mode.

20. The method of claim 18, further comprising discarding all data of the load-lock instruction and scheduling the load-lock instruction for re-execution if, in the slow-safe mode, a snoop occurs that hits the load-lock instruction.

21. A processor, comprising:

a write combining buffer to temporarily store data associated with a load-lock instruction and older store instructions, a processor core to allocate to the load-lock instruction an entry in the write combining buffer, wherein, if predetermined execution conditions are satisfied, the processor core determines whether a prefetch request for ownership has been issued to an address of the load-lock instruction pursuant to a store unlock instruction that is associated with the load-lock instruction, and whether the prefetch request for ownership has been globally observed and advancing the load-lock instruction to a slow-safe mode, a retirement unit to retire the store-unlock instruction if a predetermined retirement condition is satisfied unless a snoop occurs that hits the load-lock instruction before a predetermined retirement condition has been met.

22. The processor of claim 21, wherein the processor core discards all data of the load-lock instruction and schedules the load-lock instruction for re-execution if, in the slow-safe mode, a snoop occurs that hits the entry in the write combining buffer allocated to the load-lock instruction.

23. A multi-agent computer system, comprising:

a plurality of agents interconnected via a common bus;

at least one agent comprising:

a processor core comprising an execution unit, a lock scoreboard having fields to store data relating to execution conditions associated with a load-lock instruction, and a communication circuit coupled to the common bus, wherein the processor core, during execution of the load-lock instruction, issues a read request with an indicator that identifies a lock to be applied; and at least one other agent comprising a system memory, responsive to the read request having the indicator by locking an addressed memory location of the system memory against use by any other agent, wherein the processor core clears data associated with the load-lock instruction and data associated with other instructions depending from the load-lock instruction if the at least one other agent issues a read request for the data associated with the load-lock instruction, and replays the load-lock instruction and the other instructions depending from the load-lock instruction.

24. The system of claim 23, wherein the processor core executes the load-lock instruction if predetermined execution conditions have been met but before data of older store instructions have been drained from a write combining buffer connected to the processor core.

* * * * *